Patented Oct. 9, 1934

1,976,187

UNITED STATES PATENT OFFICE 1,976,187

WATER-INSOLUBLE AZO DYESTUFF

Wilhelm Neelmeier, Leverkusen, and Wilhelm Lamberz, Leverkusen-Wiesdorf, Germany, assignors to General Aniline Works, Inc., New York, N. Y., a corporation of Delaware No Drawing. Application August 10, 1932, Serial No. 628,270. In Germany September 8, 1931

14 Claims. (Cl. 260—95)

The present invention relates to new water-insoluble dyestuffs and to fibers dyed with said dyestuffs, more particularly it relates to azo dyestuffs which may be represented by the probable general formula:

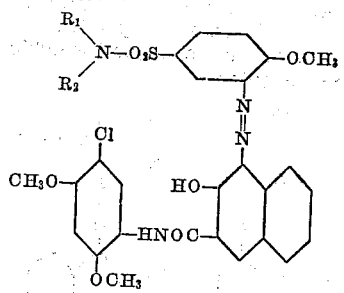

wherein $R_1$ and $R_2$ stand for alkyl or aralkyl in such a manner that $R_1$ and $R_2$ together contain at least 3 carbon atoms.

Our new dyestuffs are obtainable by diazotizing in the usual manner an aromatic amine of the general formula:

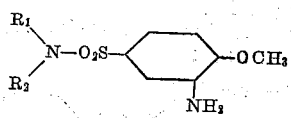

wherein $R_1$ and $R_2$ mean the same as stated above, and coupling with 2.3-hydroxynaphthoyl-1'-amino-2'-4'-dimethoxy-5'-chlorobenzene in substance or on the fiber.

Our dyestuffs prepared in substance are generally red powders, the dyestuffs prepared on the fiber according to the known method of preparing ice colors generally yield Turkey red shades of good fastness to light, weather, chlorine, and boiling in aqueous caustic soda. Especially valuable are those dyestuffs which have been prepared with such bases in which the hydrogen of the sulfamide radical is substituted by aliphatic radicals containing together 3 to 8 carbon atoms, or by two radicals of the benzyl series, or by one radical of the benzyl series and one alkyl group from 1 to 4 carbon atoms.

The bases used in our process are obtainable, for example, by treating according to customary methods 2-nitroanisol-4-sulfodiethyl-amide (obtainable from 2-nitroanisol sulfochloride and diethylamine or from 2-nitro-1-chlorobenzene-4-sulfodiethylamide and methanol) with a reducing agent. A further process of manufacture of the base is by treating 2-acetanisidine-4-sulfochloride (obtainable from 2-acetanisidine-4-sulfonic acid according to known methods) with diethylamine and saponifying the 2-acetanisidine-4-sulfodiethylamide obtained.

The invention is further illustrated by the following examples without being restricted thereto:

EXAMPLE 1

Grounding bath 4 grams of 2.3-hydroxynaphthoyl-1'-amino-2'-4'-dimethoxy-5'-chlorobenzene are dissolved in a mixture of 8 ccs. of denatured alcohol, 2 ccs. of aqueous caustic soda lye of 38° Bé., 4 ccs. of water, 4 ccs. of aqueous bone glue solution 1:10 and 4 ccs. of aqueous formaldehyde of 33% strength. The solution is stirred into about half a liter of water containing 10 ccs. of aqueous caustic soda lye of 38° Bé., 6 ccs. of Turkey red oil and 2 grams of bone glue. The solution thus obtained is made up with water to one liter.

Developing bath 2.6 grams of 1-methoxy-2-aminobenzene-4-sulfodiethylamide are dissolved with 25 ccs. of warm water and 3 ccs. of aqueous hydrochloric acid of 20° Bé. The solution is cooled to about 15° C., and 0.75 grams of sodium nitrite of 98% strength dissolved in some water are stirred in. After about 10 minutes the excess hydrochloric acid is neutralized by the addition of sodium-acetate, 50 grams of common salt are added, and the solution is made up with water to one liter.

Dyeing directions 50 grams of well-boiled cotton yarn are introduced for about half an hour into the grounding bath at a temperature of 30° C., well squeezed and introduced for about half an hour into the developing bath, rinsed, soaped in a boiling bath, rinsed again and dried. Thus is obtained a clear Turkey red dyeing of good fastness to light, chlorine, washing and boiling in soda and caustic soda.

The dyestuff has the following formula

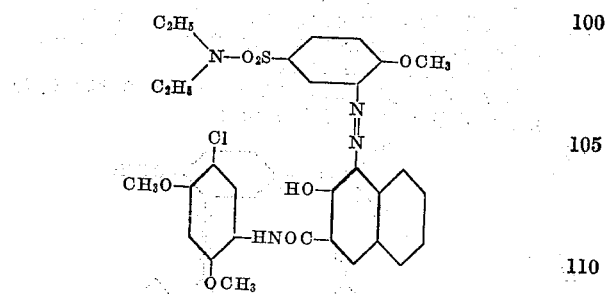

In the following table further bases are indicated falling within the scope of our invention, yielding when diazotized and coupled on the fiber with 2.3-hydroxynaphthoyl-1'-amino-2'.4'-dimethoxy-5'-chlorobenzene Turkey red shades of good fastness to chlorine, washing and boiling in soda and caustic soda, combined with good fastness to light:

1-amino-2-methoxybenzene-5-sulfodibutylamide,
1-amino-2-methoxy-5-sulfo-methylbenzylamide,
1-amino-2-methoxy-5-sulfo-dibenzylamide,
1-amino-2-methoxy-5-sulfo-methylethylamide,
1-amino-2-methoxy-5-sulfo-methyl-n-propylamide,
1-amino-2-methoxy-5-sulfo-di-n-propylamide,
1-amino-2-methoxy-5-sulfo-methyl-n-butylamide,
1-amino-2-methoxy-5-sulfo-ethyl-n-butylamide,
1-amino-2-methoxy-5-sulfo-methyl-isobutylamide,
1-amino-2-methoxy-5-sulfo-methyl-n-amylamide,
1-amino-2-methoxy-5-sulfo-n-butyl-isobutylamide,
1-amino-2-methoxy-5-sulfo-di-isobutylamide,
1-amino-2-methoxy-5-sulfo-n-amyl-isocaprylamide,

EXAMPLE 2

2.6 parts by weight of 1-methoxy-2-aminobenzene-4-sulfonic acid diethylamide are diazotized in the usual manner. The diazo solution is coupled with a solution of 3.6 parts by weight of 2.3-hydroxy-carboylnapthalene-1'-amino-2.4'-dimethoxy-5'-chloro-benzene in dilute aqueous caustic soda lye and Turkey red oil, to which has been added a quantity of sodium acetate sufficient for binding the excess mineral acid. The dyestuff separating from the solution is filtered off and washed. When dried it represents a red powder, dissolving in concentrated sulfuric acid with red-violet coloration.

We claim:—

1. As new products water-insoluble azo dyestuffs of the general formula:

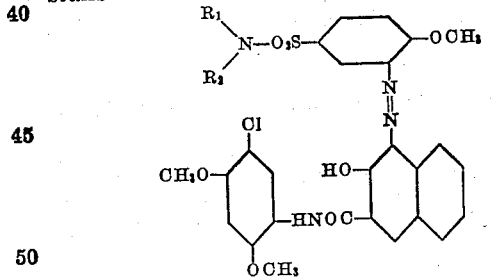

wherein $R_1$ and $R_2$ stand for alkyl or aralkyl in such a manner that $R_1$ and $R_2$ together contain at least three carbon atoms, said products being generally red powders, and yielding when prepared on the fiber generally Turkey red shades of good fastness properties.

2. As new products water-insoluble azo dyestuffs of the general formula:

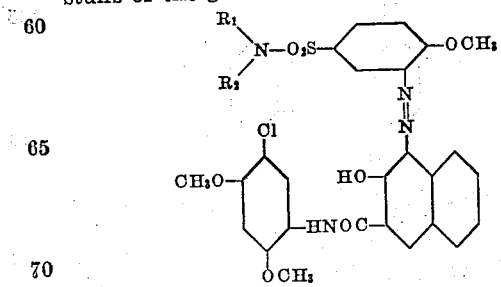

wherein $R_1$ and $R_2$ stand for alkyl groups together containing three to eight carbon atoms, said products being generally red powders, and yielding when prepared on the fiber generally Turkey red shades of good fastness properties.

3. As new products water-insoluble azo dyestuffs of the general formula:

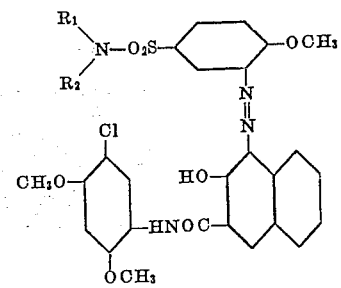

wherein $R_1$ stands for alkyl containing from one to four carbon atoms, $R_2$ stands for alkyl containing from two to four carbon atoms, said products being generally red powders, and yielding when prepared on the fiber generally Turkey red shades of good fastness properties.

4. As a new product a water-insoluble azo dyestuff of the formula:

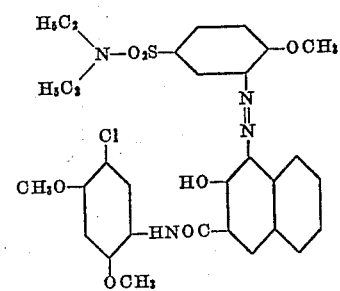

said product being a red substance, yielding when prepared on the fiber a Turkey red shade of good fastness properties.

5. As a new product a water-insoluble azo dyestuff of the formula:

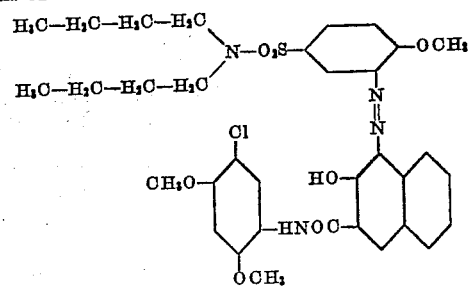

said product being a red substance, yielding when prepared on the fiber a Turkey red shade of good fastness properties.

6. As new products water-insoluble azo dyestuffs of the general formula:

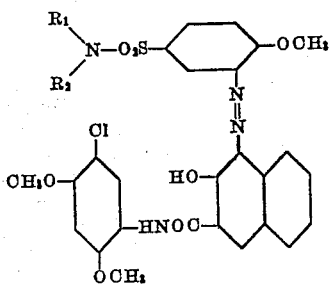

wherein $R_1$ stands for alkyl containing from one to four carbon atoms, $R_2$ stands for benzyl, said products being generally red powders, and yielding when prepared on the fiber generally Turkey red shades of good fastness properties.

7. As a new product a water-insoluble azo dyestuff of the formula:

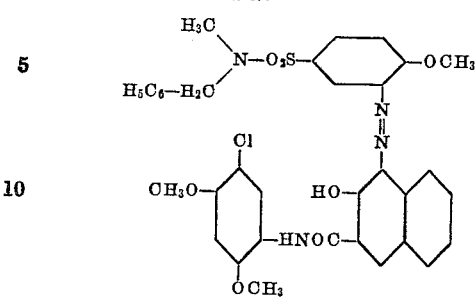

said product being a red substance, yielding when prepared on the fiber a Turkey red shade of good fastness properties.

8. Fibers dyed with a dyestuff as claimed in claim 1.
9. Fibers dyed with a dyestuff as claimed in claim 2.
10. Fibers dyed with a dyestuff as claimed in claim 3.
11. Fibers dyed with a dyestuff as claimed in claim 4.
12. Fibers dyed with a dyestuff as claimed in claim 5.
13. Fibers dyed with a dyestuff as claimed in claim 6.
14. Fibers dyed with a dyestuff as claimed in claim 7.

WILHELM NEELMEIER.
WILHELM LAMBERZ.